Samuel D. Harris
INVENTOR.

Samuel D. Harris
INVENTOR.

Aug. 6, 1957
S. D. HARRIS
2,801,885
SILO UNLOADER
Filed May 11, 1955
5 Sheets-Sheet 3
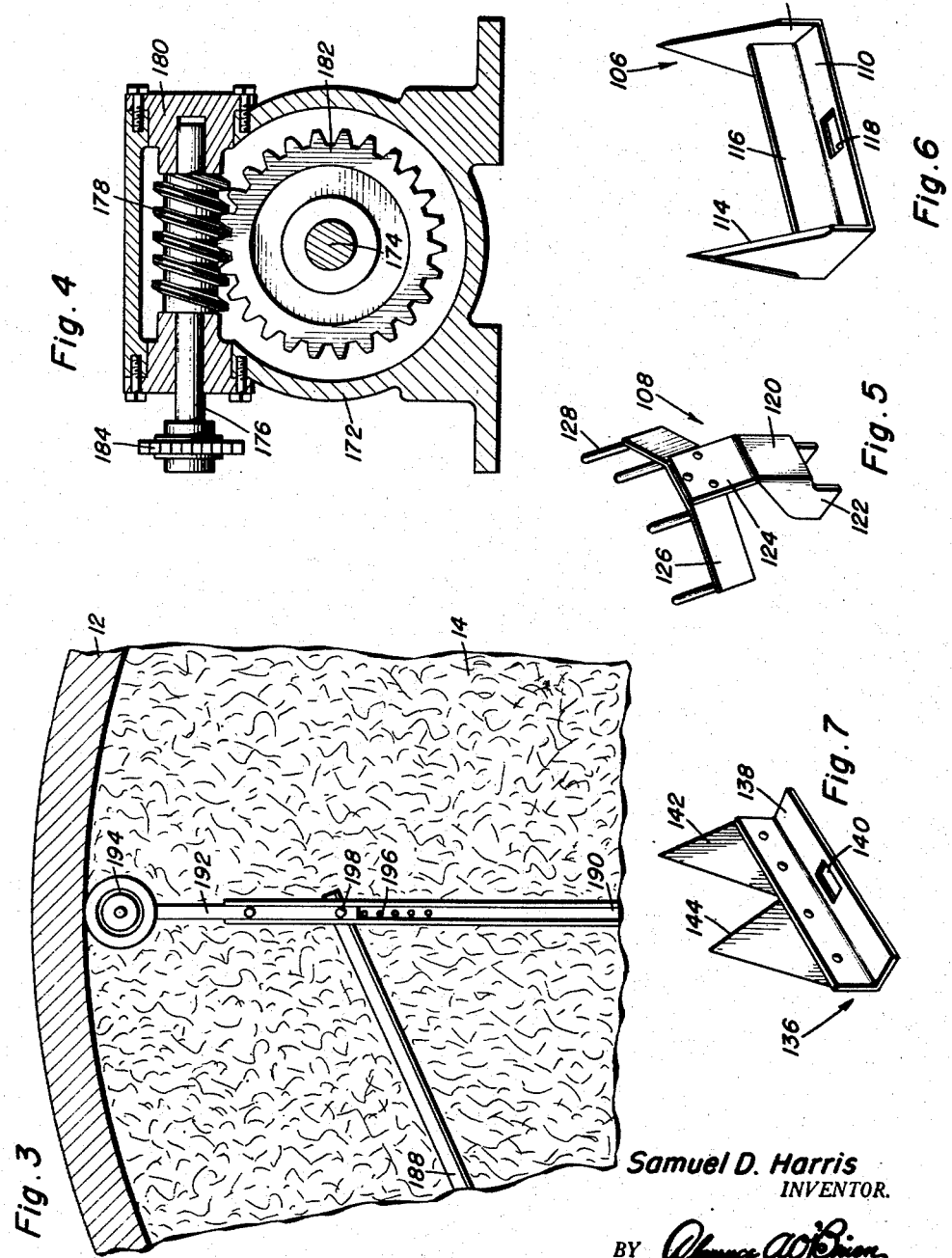
Samuel D. Harris
INVENTOR.

Aug. 6, 1957  S. D. HARRIS  2,801,885
SILO UNLOADER
Filed May 11, 1955  5 Sheets-Sheet 4

Samuel D. Harris
INVENTOR.

BY *Clarence A. O'Brien*
*and Harvey B. Jackson*
Attorneys

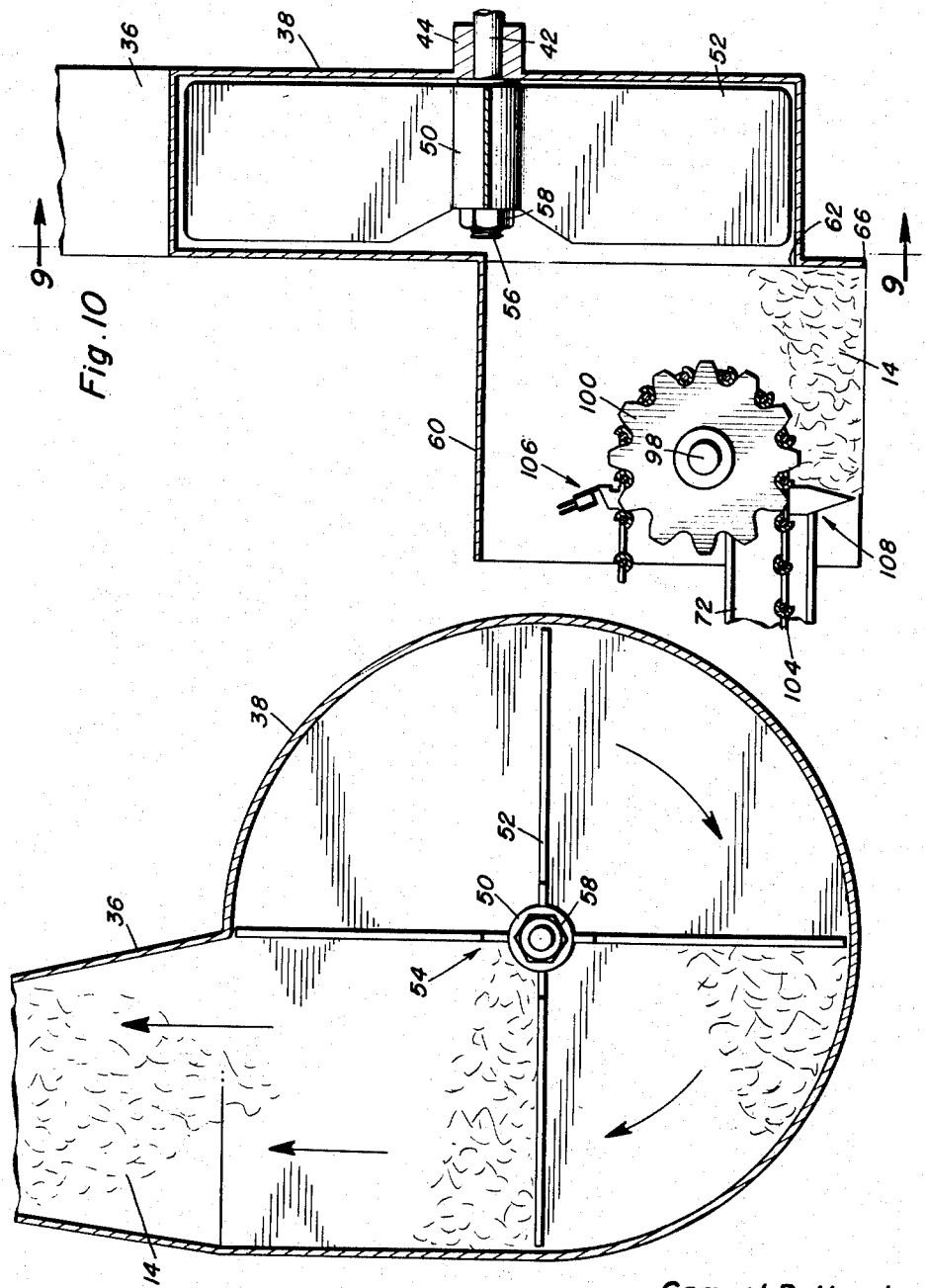

United States Patent Office 2,801,885
Patented Aug. 6, 1957

2,801,885

SILO UNLOADER

Samuel D. Harris, Mineral, Va.

Application May 11, 1955, Serial No. 507,604

9 Claims. (Cl. 302—56)

This invention generally relates to an ensilage unloading mechanism for unloading a silo, and more specifically provides a self-propelled silo unloader that is suspended from an overhead position.

The removal of ensilage from a vertical silo is one of the great time consuming chores on a farm. Generally, it has been necessary to climb a small ladder on the outer surface of the silo, endangering the farmer during this climbing operation. After getting into the top of the silo, the person usually had to manually remove the ensilage with a pitchfork or shovel. In attempts to expedite this operation, various mechanical devices have been designed and constructed with the intention of overcoming this problem. However, these previous mechanical devices have all been generally expensive in construction and operation, and in general, not practical. Accordingly, it is the primary object of the present invention to provide an improved silo unloader which is relatively simple in construction, efficient in operation and substantially automatic for unloading a silo without the expenditure of a great deal of time and effort.

Another object of the present invention is to provide a silo unloader that is supported in suspended relation from an overhead position at the top of a silo and including a self-propelled frame rotatable circumferentially within a cylindrical vertical silo.

A further object of the present invention is to provide a silo unloader which is self contained and self-propelled for rotating the unloader within a silo and provided with conveying means for moving ensilage inwardly to the center of the silo and then discharging the ensilage outwardly through a discharge tube.

Yet another object of the present invention is to provide a silo unloading device in accordance with the preceding object in which the ensilage conveying means is in the form of an endless chain conveyor having digger mechanisms and scoop-like members attached to the endless chain.

A still further important feature of the present invention is to provide an ensilage unloader as set forth in the preceding objects in which the means for discharging the ensilage through the tube includes a centrifugal vane type fan for picking up the ensilage from the conveyor and discharging it outwardly through a tube.

Yet another important feature of the present invention is to provide a silo unloader including a frame rotatable within the silo and including guide wheels engaging the inner periphery of the silo and a control wheel for retaining the frame in substantially a level position whereby the upper surface of the ensilage will be retained in substantially a level condition regardless of the relative hardness of the ensilage such as may occur when the ensilage may be frozen, which sometimes occurs in areas having relatively low temperatures.

Other important objects of the present invention will reside in its ruggedness of construction, ease of control, effectiveness for its intended purposes and its relatively inexpensive manufacturing and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a plan view of the guide wheel which was omitted from Figure 2 illustrating the adjustment thereof;

Figure 4 is a sectional view taken substantially through the transfer gear case illustrating the worm gear drive for the drive wheel;

Figure 5 is a perspective view illustrating one of the paddles or cleats mounted on the endless conveying chain;

Figure 6 is a perspective view illustrating the alternate cutters or scrapers mounted on the endless chain for alternation with the members illustrated in Figure 5;

Figure 7 is a perspective view illustrating a modified form of paddle which may be employed in conjunction with the endless chain;

Figure 1:
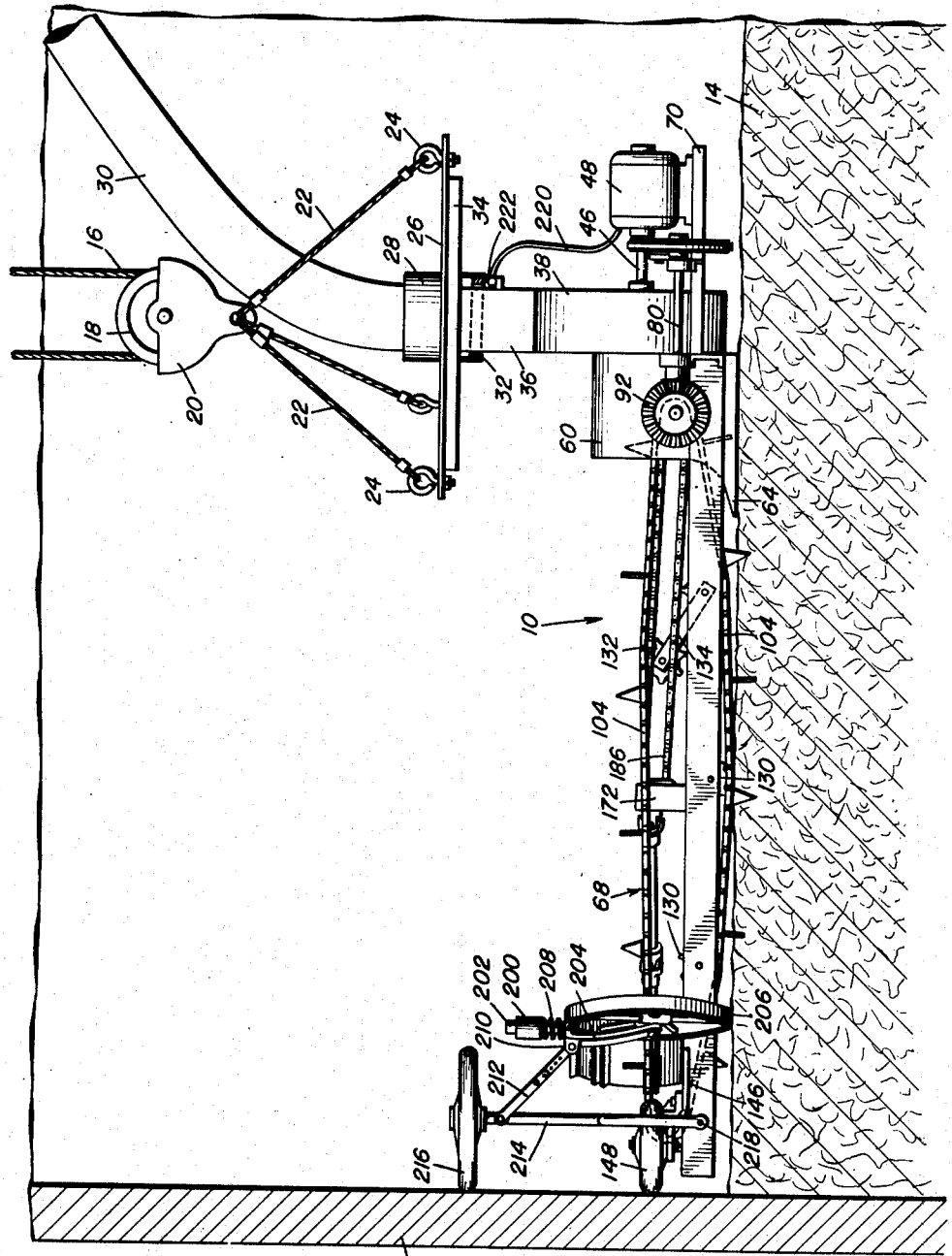
Figure 1 is a side elevational view of the silo unloader of the present invention positioned within a silo showing the relationship of the unloader to the ensilage in the silo.
Figure 2:
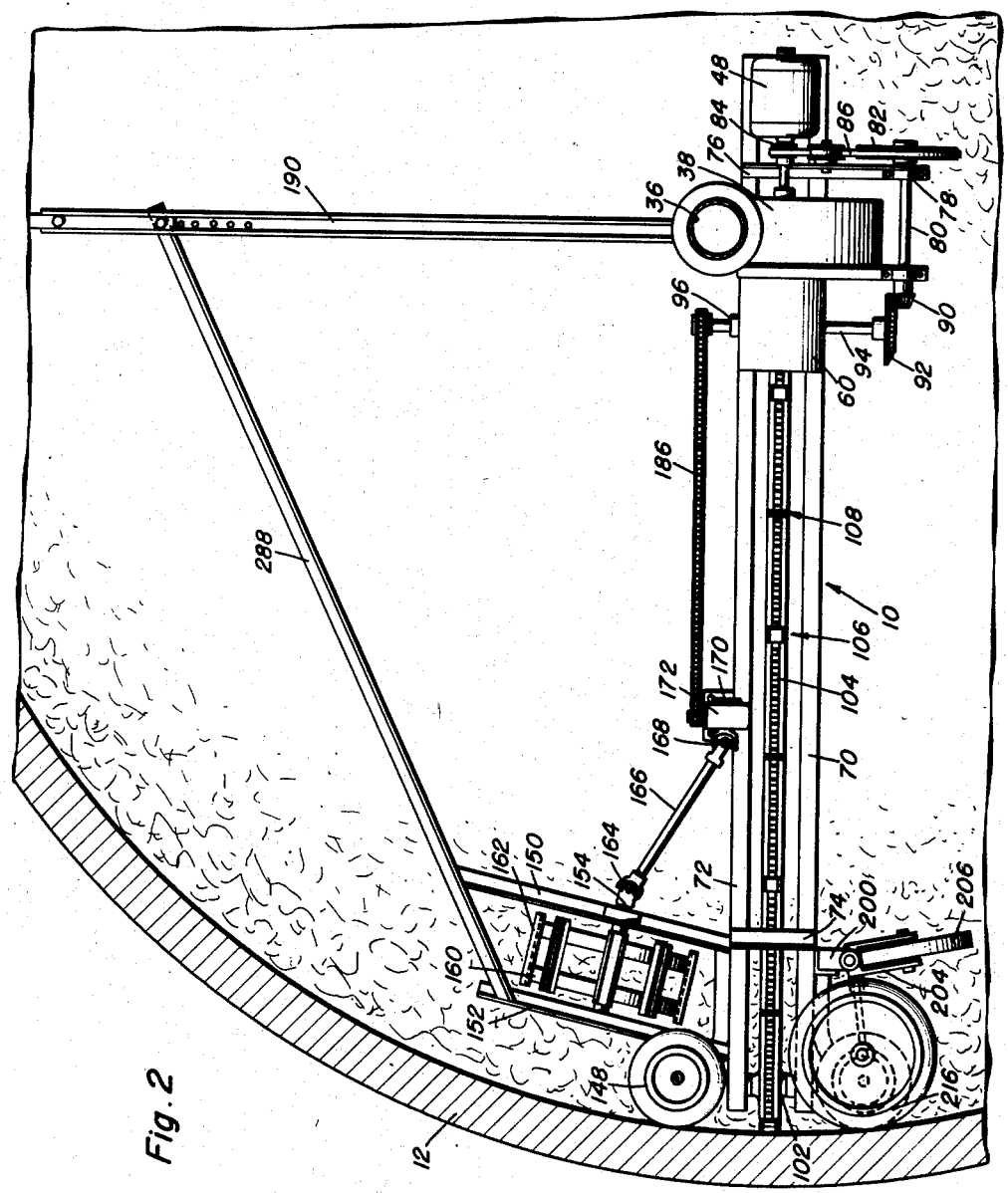
Figure 2 is a top plan view of the silo unloader illustrating the various components thereof and their relationships.
Figure 8:
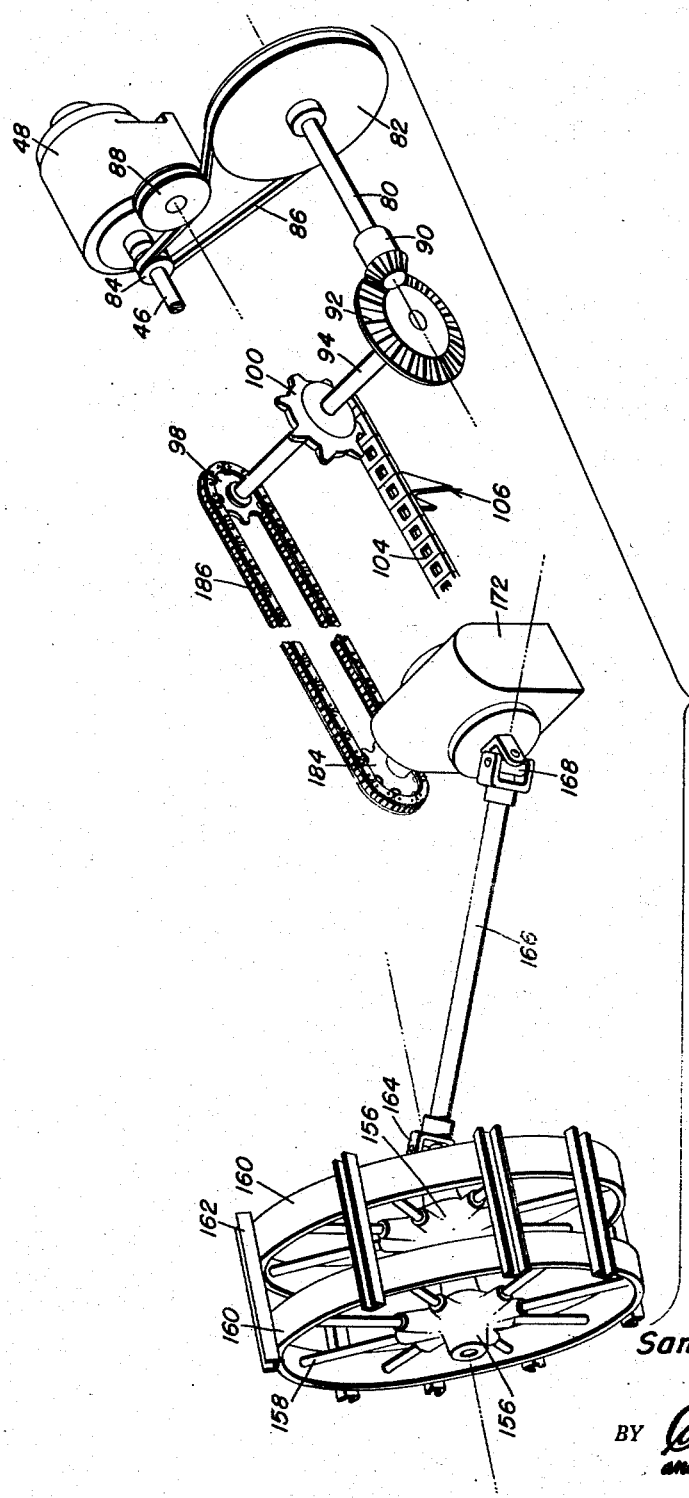
Figure 8 is a group exploded perspective view illustrating the drive mechanism of the present invention.

Figure 9 is a vertical sectional view taken substantially upon a plane passing along section line 9—9 of Figure 10 illustrating the structural details of the vane type fan and the housing therefor; and Figure 10 is a sectional view illustrating the construction of the fan together with the relationship of the housing therefor together with the relationship of the chain conveyor to the fan and its housing.

Referring now specifically to the drawings, it will be seen that the numeral 10 generally designates the silo unloader of the present invention for circumferential rotation within a vertical cylindrical silo 12 for unloading the ensilage 14 therein. The silo unloader 10 is suspended by a suitable flexible cable 16 or any other means from the upper end of the silo 12. The specific supporting means is not illustrated, nor is any means for raising and lowering the silo unloader 10 by the cable 16, although it will be understood that a suitable powered winch or a suitable hand operated hoist may be employed for raising and lowering the silo unloader 10. A supporting pulley 18 is engaged with the cable 16 and supported thereby and the pulley 18 supports a suitable pulley frame 20 that is attached to three downwardly diverging support cables 22. The support cables 22 are terminally secured to diametrically opposed eye bolts 24 secured to opposite edges of a support plate 26. A tubular collar 28 is connected to the support plate 26 and an elongated curved discharge pipe 30 is connected to the tubular collar 28 and extends outwardly through the wall of the silo 12 for discharge to the exterior thereof. The lower end of the tubular collar 28 is provided with a contact ring 32 which may be insulated from and which is connected to a suitable supply of electricity (not shown), thereby providing a pick-up ring for electrical energy for a purpose described hereinafter. Also, the plate 26 is provided with a depending portion 34 which rotatably engages and supports the discharge portion 36 of a cylindrical fan housing 38 wherein ensilage 14 discharged from the discharge portion 36 of the fan housing 38 will pass upwardly into the discharge pipe 30 and be discharged to the exterior of the silo 12.

Rotatably supported in the fan housing 38 is a shaft 42 supported in a bearing boss 44 which extends inwardly into the interior of the housing 38 and has its other end integral with the drive shaft 46 of an electric motor 48. The end of the shaft 42 disposed within the housing 38 supports a hub 50 having four radial blades 52 extending therefrom, thereby forming a vane type fan or pump impeller generally designated by the numeral 54. The shaft 42 is provided with a threaded end portion 56 receiving a securing nut 58 whereby the hub 50 and the entire impeller 54 will be rigidly secured to the inner end of the shaft 42 for rotation therewith upon actuation of the electric motor 48.

Projecting outwardly from the flat side of the housing 38 remote from the bearing boss 44 is a generally U-shaped shield 60 which generally encircles an open portion 62 in the wall of the housing 38, thereby forming an entrance into the housing 38. The lower ends of the U-shaped shield 60 generally are tapered and pointed outwardly, as designated by the numeral 64 for guiding ensilage 14 into the housing 38. As specifically illustrated in Figure 10, a depending member 66 which forms an extension of the wall of the housing 38 is provided adjacent the opening 62 whereby ensilage 14 will be urged slightly upwardly into the housing 38 due to the action of a conveying mechanism generally designated by the numeral 68.

Forming the framework for supporting the entire silo unloader is a pair of elongated frame members 70 and 72 which are rigidly interconnected by transverse brace members 74. The frame members 70 project under the housing 38 and form a support for the motor 48. A pair of elongated transverse brackets 76 are provided at each side of the housing 38 and are provided with bearing blocks 78 on the outer end thereof for supporting a shaft 80 therein. The shaft 80 is provided with an enlarged pulley 82 at one end which is in alignment with a pulley 84 on the drive shaft 46 of the motor 48 for receiving an endless belt 86 thereover. A tightening pulley 88 is provided in engagement with the endless belt 86 for tightening and maintaining the tension thereof for rotating the shaft 80. The shaft 80 is provided with a bevel gear 90 on the end thereof remote from the pulley 82 and the bevel gear 90 is in meshing engagement with an enlarged bevel gear 92 mounted on a transverse shaft 94 which extends through the shield 60 and is supported in bearing members 96. A sprocket gear 98 is mounted on the outer end of the shaft 94 and a sprocket gear 100 is mounted substantially on the center of the shaft 94 and is disposed generally in the center of the shield 60 for a purpose described hereinafter.

A sprocket gear 102 is mounted at the outer end of the frame members 70 and 72 in alignment with the sprocket gear 100 for receiving an endless conveyor chain 104. Mounted on the conveyor chain 104 is a plurality of alternating cutters and scrapers generally designated by the numeral 106 and scoop members generally designated by the numeral 108.

As illustrated in Figure 6, the scrapers and cutters 106 generally are in the form of a U-shaped member having a bight portion 110 and two leg portions 112, each of which is provided with converging front and rear edges 114 which are beveled, forming sharp edges for cutting and scraping the ensilage. Transverse plate members 116 extend between the legs 112 for a portion of the length thereof, thereby forming paddles for carrying a portion of the ensilage along with the chain 104. The bight portion 110 is provided with an enlarged aperture 118 which is utilized for attaching the scrapers and cutters 106 to the chain 104.

As illustrated in Figure 5, the scoop members generally designated by the numeral 108 include a vertically disposed U-shaped bracket 120 having depending lugs 122 for bridging engagement with the chain 104. An upwardly inclined lug 124 supports a transverse plate member 126 which has angulated end portions and a plurality of projecting fingers 128 on the upper edge thereof wherein the projecting fingers 128 together with the plate 126 will engage the ensilage 14 for moving the same towards the housing 38.

A plurality of idler sprocket gears 130 are provided along the length of the chain 104, and the central of these sprocket gears 130 which are disposed for guiding the chain 104 along its lower run are so arranged so that the central sprocket gears 130 are lower than the outer sprocket gears 130 wherein the contour of the chain 104 will be generally downwardly bulged at the central portion thereof for enhancing the action of the scoops 108 and the cutters and scrapers 106. A sprocket gear 132 is mounted on a suitable adjustable bracket 134 whereby the tension or tightness of the chain 104 may be adjusted and determined for most efficient operation.

As illustrated in Figure 7, a modified form of scraper 136 is provided which includes a transverse angular member 138 having an aperture 140 therein for mounting on the chain 104 together with a pair of projecting blades 142 having converging beveled edges 144 wherein the blades 142 will contact and carry the ensilage 14 towards the housing 38.

It will be understood that the chain 104 together with the sprocket gears 100 and 102 and the scrapers or cutters 106 and the scoops 108 form the conveying means generally designated by the numeral 68.

A pair of brackets 146 are disposed at the outer ends of the frame members 70 and 72 and project slightly thereabove for journaling a pair of guide wheels 148 which contact the inner peripheral surface of the silo 12. The guide wheels 148 are generally disposed in the same plane as the outer sprocket gear 102 and are disposed to each side thereof for engaging the silo 12 in spaced relation thereto whereby the curvature of the silo 12 will not affect the positioning of the cutters and scrapers 106 and the scoops 108 as they pass over the sprocket gear 102 whereby the ensilage 14 adjacent the wall of the silo 12 will be moved inwardly, thereby assuring that substantially no ensilage will be left on the wall of the silo 12 as sometimes occurs when the ensilage is partially frozen around the edges thereof.

Projecting laterally from the frame member 72 is a pair of bracket members 150 and 152 which are disposed in spaced parallel relation for rotatably supporting a transverse shaft 154 which is secured to a pair of hub members 156 having radial spokes 158 extending therefrom and being secured to a peripheral rim 160. Attached to the outer surface of the peripheral rims 160 is a plurality of outwardly facing channel-shaped members 162 having their bight portions secured to the rims 160. The rims 160 and the channel-shaped members 162 which form lugs engage the upper surface of the ensilage 14.

Connected to the shaft 154 by a universal connection 164 is a drive shaft 166 having a universal connection 168 at the other end thereof. Supported on a bracket 170 projected from the frame member 72 is a transfer gear case 172 having a drive shaft 174 projecting therefrom and connected to the universal connection 168 for driving the shaft 166 and the shaft 154.

The gear case 172 is provided with an input shaft 176 having a worm gear 178 mounted thereon, and the shaft 176 is journaled in suitable bearings 180 and is in meshing engagement with a pinion gear 182 whereby the pinion gear will be rotated upon rotation of the worm drive shaft 176.

Mounted on the outer end of the shaft 176 is a sprocket gear 184 which is in alignment with the sprocket gear 98 on the shaft 94 and an endless sprocket chain 186 encircles the sprocket gear 184 and the sprocket gear 98 for driving the shaft 176 upon rotation of the motor 48.

Interconnecting the ends of the bracket members 150 and 152 is an elongated brace member 188 which is rigidly secured thereto and secured at its outer end to an elongated extending member 190 for adjustably supporting a wheel support rod 192 having a guide wheel 194 on the outer end thereof. The brace member 190 is provided with a plurality of longitudinally spaced apertures 196 wherein suitable fastening members 198 may be utilized for adjustably supporting the wheeled support member 192 for adjusting the effective length of the brace member 190. The brace member 190 has its inner end secured to the frame members 72 and 70, thereby forming a rigid, generally triangulated unit for circumferential rotation within the silo 12.

Supported adjacent the outer end of the frame member 70 is a bracket 200 which journals and supports a vertical shaft 202 on a U-shaped yoke 204 which rotatably supports a levelling wheel 206 which engages the upper surface of the ensilage 14. A coil compression spring 208 is disposed between the bearing bracket 200 and the upper end of the yoke 204 for urging the wheel 206 into engagement with the ensilage 14 wherein the bracket 200 being attached to the frame member 70 will raise and lower the frame member 70 for retaining it in substantially a level position. For accomplishing this, the yoke 204 is provided with lugs 210 thereon for connection of an adjustable rod 212 that is attached at its other end to an upstanding support rod 214 having a control wheel 216 at the upper end thereof in engagement with the inner peripheral surface of the silo 12. Pivotal movement of the support rod 214 which is attached to the frame member 70 by pivot pin 218 will cause upward or downward movement of the control wheel 206 thereby retaining the conveying mechanism in substantially a level position thereby assuring that the upper surface of the ensilage 14 will be retained in substantially a level condition.

In operation of the silo unloader 10, any suitable switch means may be utilized to control the supply of electrical energy to the motor 48 which is supplied through the conduit 220 and the contact member 222 which is in constant electrical contact with the ring 32 which is connected to the electrical source whereby the motor may be actuated at any rotatable position of the silo unloader.

As the motor 48 and the shaft 46 rotates, the fan 54 is rotated simultaneously with the pulley 82, shaft 80, shaft 94, driving wheel including the rims 160 and the conveyor chain 104 for simultaneous operation wherein the cutters or scrapers 106 and the scoops 108 will urge ensilage 14 into the housing 38 whereby the fan member 54 will blow the ensilage and air outwardly through the discharge pipe 30. Due to the specific orientation of the various driving elements, the driving wheel will rotate the silo unloader within the silo 12 wherein the frame members 72 and 70 will move towards the portion of the silo 12 which is engaged by the wheel 194 which is disposed substantially in 90° spaced relation to the wheels 148. This will assure that the fan housing 38 and the motor 48 will be retained substantially in the center of the silo and the entire area of the upper surface of the ensilage 14 will be passed over by the silo unloader 10 for urging ensilage inwardly to the central portion of the silo 10 over the entire area thereof.

While various lubrication fittings and other bracing details are not specifically illustrated, it will be understood that various lubrication fittings may be provided and also various minute details may be changed as may become necessary in practical use of the device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A silo unloader comprising a frame supported in a silo, a driving wheel on said frame for engaging ensilage for rotating said frame in the silo, means on said frame for conveying ensilage to the central portion of the silo, and means for discharging ensilage from the central portion of the silo to the exterior thereof, said frame including a pair of angularly arranged frame members rigidly interconnected at their inner ends and generally forming radii of the silo, and a guide wheel at the outer end of each frame member for engagement with the inner surface of the silo wall, said frame having a prime mover mounted thereon for simultaneously driving said driving wheel, conveying means and discharge means, said conveying means including an endless conveyor chain encircling spaced sprocket gears, alternating ensilage cutters and scoops mounted on said chain, said chain having an elongated horizontal run paralleling the upper surface of the ensilage for engaging the cutters and scoops therewith for moving ensilage inwardly to the central portion of the silo, said cutters having cutting edges for providing longitudinal cuts into the ensilage with the scoops gathering ensilage between the cuts.

2. The combination of claim 1 wherein a plurality of idler sprocket gears are mounted on said frame for engaging the upper surface of the horizontal run of said chain, certain of said idler gears being disposed below the remote idler gears for forcing the chain downwardly at the intermediate portion of the horizontal run thereof for assuring contact with the ensilage.

3. A silo unloader comprising a frame supported in a silo, a driving wheel on said frame for engaging ensilage for rotating said frame in the silo, means on said frame for conveying ensilage to the central portion of the silo, and means for discharging ensilage from the central portion of the silo to the exterior thereof, said frame including a pair of angularly arranged frame members rigidly interconnected at their inner ends and generally forming radii of the silo, and a guide wheel at the outer end of each frame member for engagement with the inner surface of the silo wall, said frame having a prime mover mounted thereon for simultaneously driving said driving wheel, conveying means and discharge means, said conveying means including an endless conveyor chain encircling spaced sprocket gears, alternating ensilage cutters and scoops mounted on said chain, said chain having an elongated horizontal run paralleling the upper surface of the ensilage for engaging the cutters and scoops therewith for moving ensilage inwardly to the central portion of the silo, said discharge means including a fan housing, a vane type fan impeller rotatably mounted in said housing, a discharge tube rotatably supported on said housing and in communication therewith, said housing having an enlarged opening in one side wall thereof, a shield partially surrounding said opening and overlying the inner portion of said chain for guiding ensilage into the housing.

4. A silo unloader comprising a frame supported in a silo, a driving wheel on said frame for engaging ensilage for rotating said frame in the silo, means on said frame for conveying ensilage to the central portion of the silo, and means for discharging ensilage from the central portion of the silo to the exterior thereof, said frame including a pair of angularly arranged frame members rigidly interconnected at their inner ends and generally forming radii of the silo, and a guide wheel at the outer end of each frame member for engagement with the inner surface of the silo wall, said frame having a prime mover mounted thereon for simultaneously driving said driving wheel, conveying means and discharge means, said conveying means including an endless conveyor chain encircling spaced sprocket gears, alternating ensilage cutters and scoops mounted on said chain, said chain having an elongated horizontal run paralleling the upper surface of the ensilage for engaging the cutters and scoops therewith for moving ensilage inwardly to the central portion of the silo, a levelling wheel mounted on said frame adjacent the wall of the silo in contact with the upper surface of the ensilage for controlling the vertical position of the frame, said levelling wheel being vertically movable in relation to the frame, an upstanding support rod pivotally suported on said frame, a control wheel mounted on the upper end of said rod in rolling contact with the silo wall, adjustable means interconnecting the rod and the levelling wheel to raise and lower the levelling wheel in response to vertical angular movement of the frame for retaining the frame in level position and for providing initial adjustment of the frame for determining the normal position of the frame, said levelling wheel being independent of the driving wheel.

5. A silo unloader comprising a mobile frame disposed within a silo, a driving wheel on said frame for engaging ensilage for moving said frame in the silo, said frame having guide wheels for engagement with the inner surface of the silo wall at circumferentially spaced points, radially extending conveying means extending outwardly from the center of said frame for moving ensilage towards the center of the silo, discharge means on said frame adjacent the center of the silo for receiving ensilage from the conveying means and discharging the same exteriorly of the silo, and means on said frame at the outer end thereof for maintaining the frame in substantially level position, said means engaging the surface of the silo for raising and lowering the outer end of the frame in response to variations in the angular relation between the silo and the frame, and means for driving said driving wheel, conveying means and said discharge means, said conveying means including an endless conveyor chain mounted on spaced sprocket gears on said frame, said chain having a bottom run substantially parallel to the surface of the ensilage, alternating cutters and scoops mounted on said chain for engagement with the ensilage for moving the ensilage towards the discharge means, said cutters being flat and having sharpened edges, said cutters being disposed in parallel relation to the path of movement of the conveyor chain, said scoops having a large area disposed transversely of the path of movement of the conveyor chain for moving the ensilage.

6. A silo unloader comprising a movable frame for positioning within a silo, guide wheels on said frame for engagement with the inner surface of the silo at circumferentially spaced points, means for driving said frame in a rotational manner within the silo, a radially extending conveyor chain supported on said frame for engagement with the upper surface of ensilage in the silo for moving the ensilage radially inwardly, means disposed on said frame for receiving ensilage from the conveyor chain and discharging the same exteriorly of the silo, and means for driving said conveyor chain and ensilage discharge means, said conveyor chain including an elongated endless sprocket chain, end sprocket gears rotatably supported on said frame and receiving the sprocket chain, said sprocket chain having a lower run generally paralleling the upper surface of the ensilage, alternating cutters and scoops mounted on said chain for engagement with the ensilage for moving the ensilage towards the discharge means, said cutters being flat and having sharpened edges, said cutters being disposed in par-
allel relation to the path of movement of the conveyor chain, said scoops having a large area disposed transversely of the path of movement of the conveyor chain for moving the ensilage.

7. The combination of claim 6 together with a plurality of idler sprocket gears on the frame in engagement with the upper surface of the lower run of the sprocket chain, at least one of said idler gears being disposed below the horizontal plane of the end sprocket gears whereby an intermediate portion of the lower run of the sprocket chain will be depressed for assuring contact with the upper surface of the ensilage.

8. A silo unloader comprising a movable frame for positioning within a silo, guide wheels on said frame for engagement with the inner surface of the silo at circumferentially spaced points, means for driving said frame in a rotational manner within the silo, a radially extending conveyor chain supported on said frame for engagement with the upper surface of ensilage in the silo for moving the ensilage radially inwardly, means disposed on said frame for receiving ensilage from the conveyor chain and discharging the same exteriorly of the silo, and means for driving said conveyor chain and ensilage discharge means, said conveyor chain including an elongated endless sprocket chain, end sprocket gears rotatably supported on said frame and receiving the sprocket chain, said sprocket chain having a lower run generally paralleling the upper surface of the ensilage, a plurality of idler sprocket gears on the frame in engagement with the upper surface of the lower run of the sprocket chain, at least one of said idler gears being disposed below the horizontal plane of the end sprocket gears whereby an intermediate portion of the lower run of the sprocket chain will be depressed for assuring contact with the upper surface of the ensilage.

9. The combination of claim 8, wherein said ensilage discharge means includes a radial vane type fan encased in a housing having a tangential discharge tube communicating with the exterior of the silo, one side wall of the casing having an enlarged inlet opening adjacent the bottom thereof for permitting movement of ensilage into the housing in direction generally parallel to the axis of rotation of the fan, and an inverted U-shaped shield extending outwardly from said opening in overlying relation to the inner end sprocket gear for guiding ensilage into the housing.

References Cited in the file of this patent

UNITED STATES PATENTS

| 940,583 | Capers | Nov. 16, 1909 |
| 2,651,438 | Peterson | Sept. 8, 1953 |
| 2,671,696 | McLean | Mar. 9, 1954 |
| 2,678,241 | Miller | May 11, 1954 |
| 2,719,058 | Van Dusen | Sept. 27, 1955 |
| 2,756,112 | Knutson | July 24, 1956 |

FOREIGN PATENTS

| 37,169 | Sweden | July 8, 1914 |
| 803,135 | Germany | Jan. 25, 1951 |